United States Patent [19]

Stockhausen

[11] Patent Number: 5,467,748
[45] Date of Patent: Nov. 21, 1995

[54] INTERNAL COMBUSTION ENGINE WITH INTAKE PORT THROTTLING AND EXHAUST CAMSHAFT PHASE SHIFTING FOR CYLINDER DEACTIVATION

[75] Inventor: William F. Stockhausen, Northville, Mich.

[73] Assignee: Ford Motor Company, Dearborn, Mich.

[21] Appl. No.: 407,523

[22] Filed: Mar. 16, 1995

[51] Int. Cl.$^6$ ................................................ F02B 77/00
[52] U.S. Cl. ........................................................ 123/198 F
[58] Field of Search ............................. 123/198 F, 481

[56] References Cited

U.S. PATENT DOCUMENTS

| | | | |
|---|---|---|---|
| 3,441,009 | 4/1969 | Rafanelli | 123/90.15 |
| 4,344,393 | 8/1982 | Etoh et al. | 123/198 F |
| 4,365,597 | 12/1982 | Iizuka et al. | 123/198 F |
| 4,401,069 | 8/1983 | Foley | 123/198 F |
| 4,499,870 | 2/1985 | Aoyama | 123/198 F |
| 4,522,179 | 6/1985 | Nishimura et al. | 123/198 F |
| 5,133,310 | 7/1992 | Hitomi et al. | 123/90.15 |
| 5,190,013 | 3/1993 | Dozier | 123/198 F |

OTHER PUBLICATIONS

"Adaptive Robotic End–Effector Handles Challenging Applications", *Robotics World*, Summer 1993.

*Primary Examiner*—Noah P. Kamen
*Attorney, Agent, or Firm*—Jerome R. Drouillard; Roger L. May

[57] ABSTRACT

A four-stroke cycle, multi-cylinder reciprocating internal combustion engine has a camshaft phaser for powering an exhaust camshaft and for adjusting timing of the camshaft with respect to the rotational position of the crankshaft so that the cylinders of the engine may be deactivated by adjusting the camshaft timing such that the exhaust valves for each cylinder open and close at points which are approximately symmetrical about a rotational position of the crankshaft at which the direction of motion of the pistons change. The controller also closes an intake port throttle during cylinder deactivation.

13 Claims, 3 Drawing Sheets

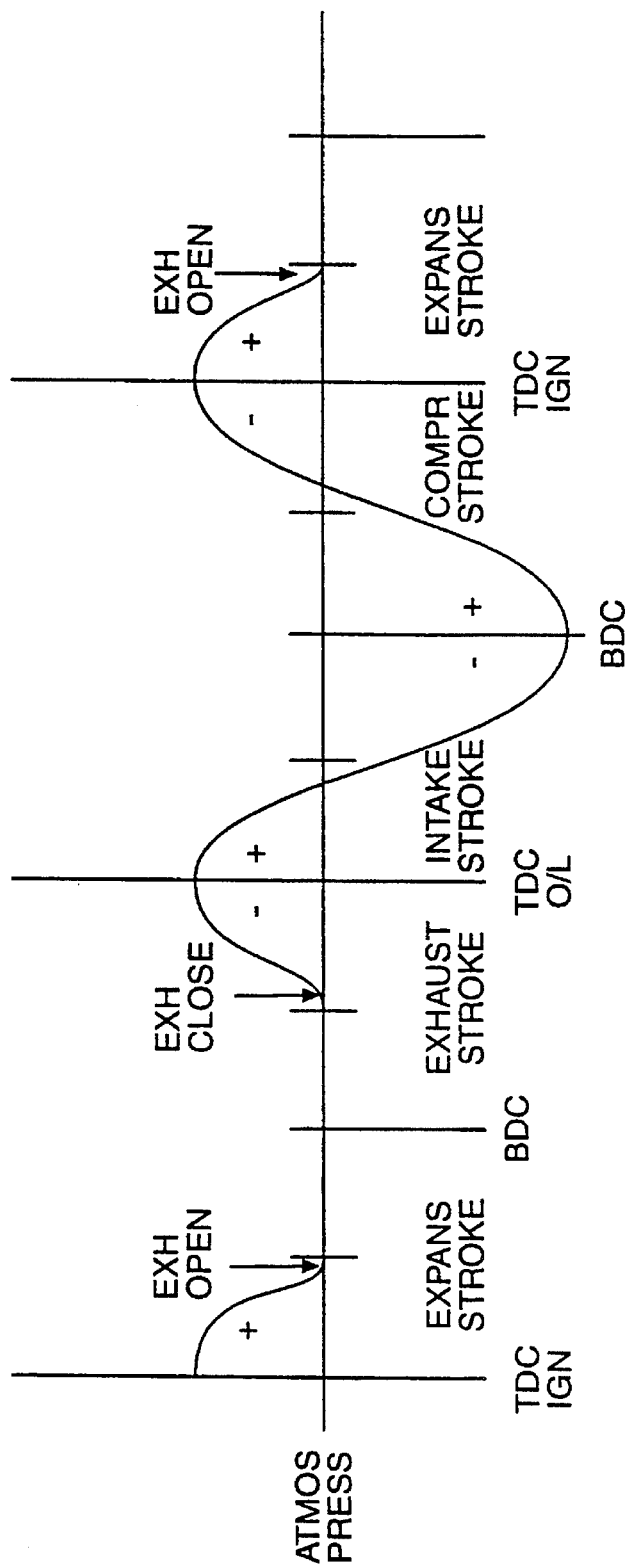
FIG.5
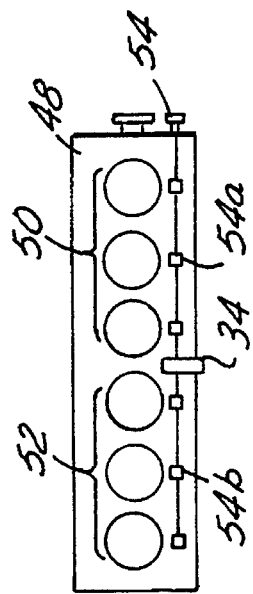
FIG.7
FIG.6

INTERNAL COMBUSTION ENGINE WITH INTAKE PORT THROTTLING AND EXHAUST CAMSHAFT PHASE SHIFTING FOR CYLINDER DEACTIVATION

BACKGROUND OF THE INVENTION

The invention relates to a system and method for selectively deactivating at least some of the cylinders of a reciprocating internal combustion engine.

DISCLOSURE INFORMATION

Four-stroke cycle, multicylinder reciprocating internal combustion engines used in automobiles are capable of being operated over great speed and load ranges. Those skilled in the art have recognized for years that lower specific fuel consumption is usually achieved when an engine is operated at relatively higher load. For spark ignition engines, however, this is particularly true because throttling losses are minimized when the engine is operated at or near wide-open throttle at full load conditions. Unfortunately, in automotive usage, engines are frequently required to operate at much less than maximum load. While operating at part load, fuel economy suffers because of pumping losses and, as a result, it is desirable to avoid this type of operation.

Systems have been designed which avoid part-load operation in at least some of the cylinders of an engine by deactivating some of the cylinders so as to allow the active cylinders to be operated at much higher loads. For example, it is known to disable the valves of one or more cylinders in an engine, which traps air in the deactivated cylinders. The trapped air is alternatively compressed and expanded. Engine operation according to this method is shown in FIG. 3 of this specification. Beginning at that top dead center location which is noted "TDC" at the point of ignition ("IGN"), the pressure within the cylinder decreases from a superatmospheric level down through atmospheric during the expansion stroke and ultimately decreases to a subatmospheric level at bottom dead center ("BDC"). Then the piston begins its upstroke, or exhaust stroke, and pressure ultimately builds to the same maximum at TDC at overlap ("O/L"). Then, expansion to a subatmospheric pressure occurs during the intake stroke as the piston moves down again to the position of BDC and thereafter rises during the compression stroke to TDC of ignition. Because the piston merely compresses and expands air which is trapped in the cylinder, the thermodynamic losses are relatively small and the other engine cylinders, which are actually firing, may be operated with sufficiently greater efficiency that the overall efficiency of the engine is improved. Unfortunately, systems which deactivate both intake and exhaust valves of an engine's cylinders are quite expensive and are therefore unattractive, because vehicles in which fuel economy is most important are frequently sold in the lower price range, and are therefore unable to command a price sufficient to offset the cost of the added equipment.

A system according to the present invention produces a result which is comparable to the previously described valve disabling system, while using less expensive hardware—hardware which may be used to advantage in other engine operating modes. It is therefore an advantage of the present invention that cylinder deactivation may be achieved without the necessity of cylinder valve actuation hardware capable of completely deactivating the valves in one or more cylinders. Rather, the deactivation is achieved through a combination of intake port throttling and exhaust valve timing adjustment.

SUMMARY OF THE INVENTION

According to the present invention, a four-stroke cycle, multicylinder reciprocating internal combustion engine having a crankshaft and a plurality of pistons reciprocably contained within a plurality of cylinders includes at least one intake popper valve and at least one exhaust popper valve for each engine cylinder, as well as a camshaft for operating at least the exhaust valves of the engine, and a camshaft phaser for powering the camshaft and for adjusting the timing of the camshaft with respect to the rotational position of the crankshaft. The engine further includes a plurality of intake port throttles, with one of the throttles mounted in proximity to, and upstream of, the intake valve or valves of each cylinder, as well as a controller, connected with the port throttles and with the camshaft phaser, for deactivating at least some of the cylinders by operating the camshaft phaser and the port throttle such that for each cylinder which is to be deactivated, the port throttle is closed and the camshaft timing is adjusted such that the exhaust valve opens and closes at points which are approximately symmetrical about a rotational position of the crankshaft at which the direction of motion of the cylinder's piston changes. During deactivation, the exhaust valve preferably opens and closes in approximately the same number of crank angle degrees about the piston's BDC position at the conclusion of the expansion stroke, or alternatively, about the piston's TDC position at the conclusion of the exhaust stroke. Thus, the exhaust camshaft may be retarded approximately 110 crankshaft degrees from its normal operating point, or advanced approximately 70 crankshaft degrees from its normal operating point.

A system according to the present invention may be applied to a V-type engine having two banks of cylinders, with each bank (or just the bank to be deactivated) having a separate exhaust camshaft and an associated camshaft phaser, with a controller operating the camshaft phaser and port throttles of one of the bank's cylinders such that all of the cylinders of one bank are deactivated. The present system may also be applied to an engine in which a V-type engine having a single camshaft for each bank of cylinders, with a controller operating a camshaft phaser and port throttles of a single bank so that the bank may be deactivated.

According to another alternative of the present invention, an engine having the present system may comprise an inline type having front and rear groups of cylinders equal in number, with each group having a separate exhaust camshaft and associated camshaft phaser, with the controller operating the camshaft phaser and port throttles of one of the groups of the cylinders such that all of the cylinders of the group are deactivated.

According to yet another aspect of the present invention, a method for operating a four-stroke cycle, multi-cylinder reciprocating internal combustion engine in fewer than the maximum number of cylinders includes the steps of: sensing a plurality of engine operating parameters including at least engine load and engine speed; comparing the sensed operating parameters with predetermined threshold values; issuing a fractional operation command in the event that the sensed parameters exceed threshold values; closing intake port throttles in each of the cylinders to be deactivated in response to the fractional operation command; and, adjusting the timing of a camshaft which operates exhaust popper valves of the cylinders to be deactivated so that the position of maximum exhaust valve lift is moved from approximately 900 before TDC on the exhaust stroke to a point at which the maximum lift occurs at TDC of the exhaust stroke. In any event, deactivation of cylinders according to the present invention is marked by operation of a camshaft phaser such that the position of maximum exhaust valve lift is moved from 900 before TDC on the exhaust stroke to a point at which a maximum lift occurs either at TDC of the exhaust stroke or at BDC of the expansion stroke.

As used herein, the terms "intake stroke," "exhaust stroke," "compression stroke," and "expansion stroke" are meant to refer to these conventional strokes which are known to those skilled in the art of internal combustion engines, and these strokes are referred to in a conventional fashion even when the cylinder is deactivated. This is done for the convenience of understanding the points in the cycle of engine operation wherein various events occur according to the present invention.

BRIEF DESCRIPTION OF THE DRAWINGS

FIG. 5 is a second diagram of cylinder pressure and crankshaft position of an engine having an alternative exhaust camshaft timing strategy according to the present invention.

FIG. 6 is a schematic illustration of a V-type of engine suitable for use with the present invention.

FIG. 7 is a schematic representation of an inline type of engine suitable for use with the present invention.

DETAILED DESCRIPTION OF THE PREFERRED EMBODIMENTS

Figure 1:
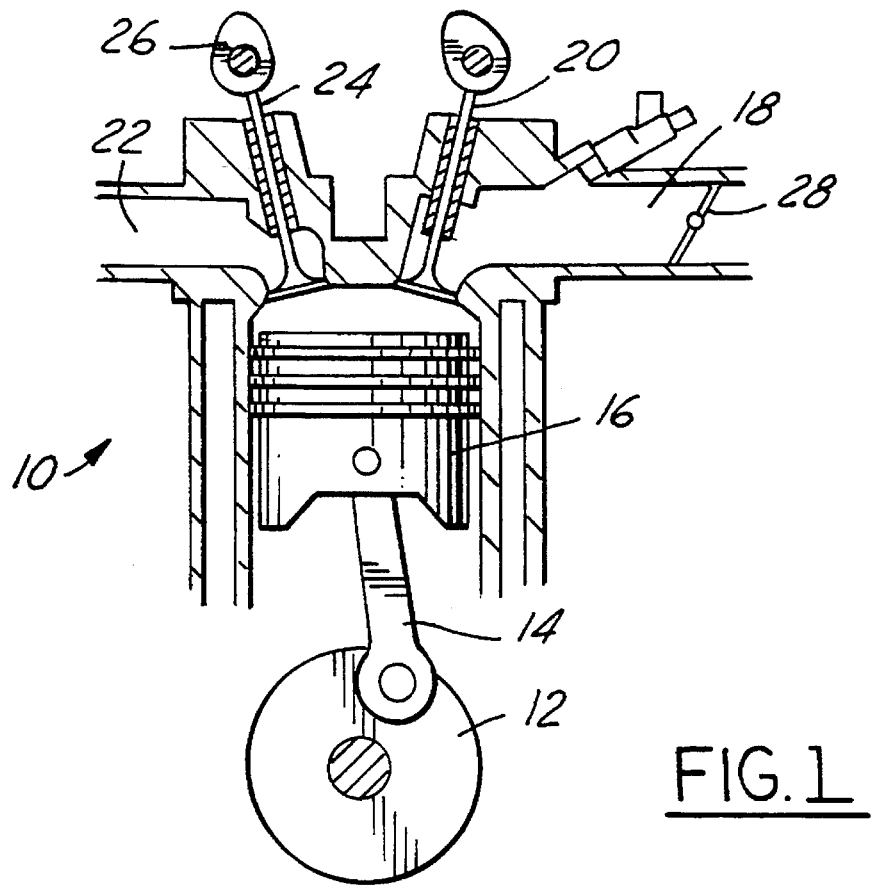
FIG. 1 is a schematic representation of an engine equipped with a cylinder deactivation system according to the present invention.

As shown in FIG. 1, one cylinder of a multicylinder, four-stroke cycle reciprocating internal combustion engine 10 has crankshaft 12 with connecting rod 14 and piston 16. Air flows into the cylinder past intake port throttle 28 and through intake port 18 and then past intake valve 20. Exhaust gases exit the cylinder through exhaust port 22 after flowing past exhaust valve 24. Exhaust valve 24 is operated by exhaust camshaft 26. As may be seen in FIG. 1, ingress of air into the engine may be stopped by closing intake port throttle 28 entirely; when port throttle 28 is closed, air will not be allowed to enter the individual cylinder associated with the port throttle, even if intake valve 20 is allowed to open and close in normal fashion. A combination of port throttle 28 and the adjustment of timing of exhaust camshaft 26, will produce cylinder pressure histories of the types shown in FIGS. 4 and 5.

Figure 2:
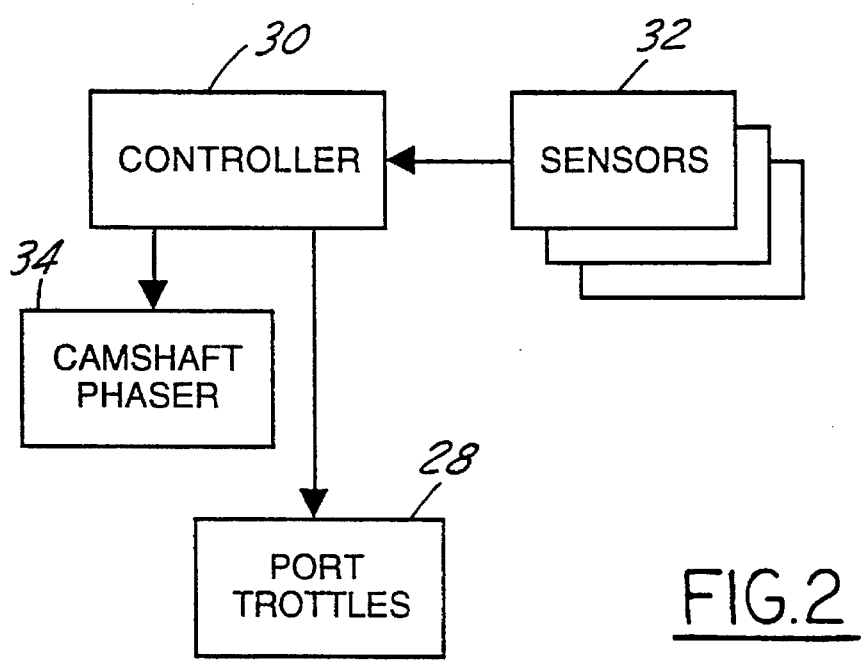
FIG. 2 is a block diagram of a control system according to the present invention.

FIG. 2 illustrates a control system according to the present invention. Controller 30 receives a variety of inputs from engine operating sensors 32 which include many of the types of sensors known to those skilled in the art of engine control and suggested by this disclosure. Accordingly, sensors 32 may include engine speed, engine load, intake manifold absolute pressure, engine intake air mass flow rate, engine temperature, vehicle speed, vehicle gear selection, throttle position, accelerator position, and other parameters known to those skilled in the art and suggested by this disclosure. The fact remains that there are many conditions in which it is desirable to operate an engine in less than the maximum number of cylinders, and, as noted above, the purpose of the present invention is to allow such fractional operation. As further shown in FIG. 2, controller 30, which may comprise an electronic engine operating controller drawn from many of the types known to those skilled in the art of automotive electronic engine controllers, is connected with camshaft phaser 34 and port throttles 28.

Controller 30 operates an engine according to the present invention by sensing a plurality of engine and vehicle operating parameters, including at least engine load and engine speed. Other parameters which could be used include, without limitation, vehicle speed, throttle position, and other parameters known to those skilled in the art and suggested by this disclosure. Controller 30 compares the sensed operating parameters with predetermined threshold values. For example, in a typical control algorithm, cylinder deactivation would not be used unless engine speed exceeded a minimum threshold value and engine load was less than a minimum threshold value. In this sense, the term "exceed" is used herein to mean that the value of the sensed parameter may either be greater than or less than the threshold value. In the event that sensed parameters exceed threshold values, controller 30 will command camshaft phaser 34 to move to adjust the timing of camshaft 26 which operates exhaust valves 24 to achieve the timing shown in either FIG. 4 or FIG. 5. The position of maximum exhaust valve lift is moved from approximately 900 before TDC on the exhaust stroke to a point in which maximum lift occurs either at TDC of the exhaust stroke, or at BDC of the expansion stroke. In either case, pressure within the cylinder will be maintained approximately at atmospheric level during the time in which the exhaust valve is open.

Figure 3:
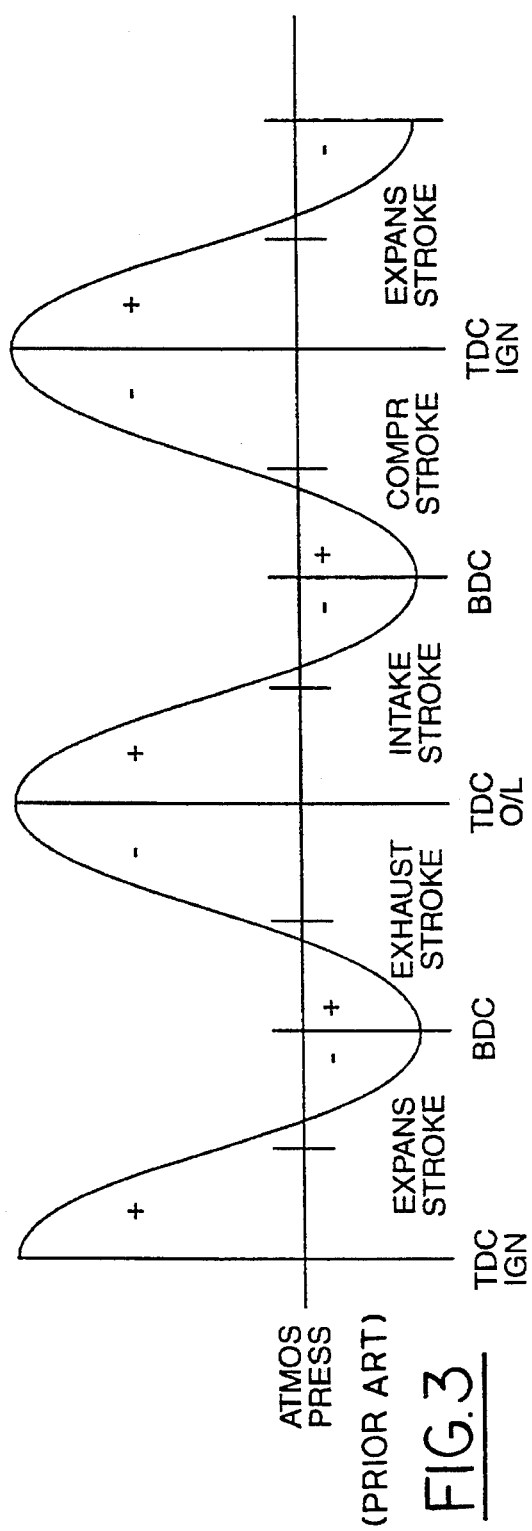
FIG. 3 is a diagram showing cylinder pressure and crankshaft position with a prior art cylinder deactivation system.
Figure 4:
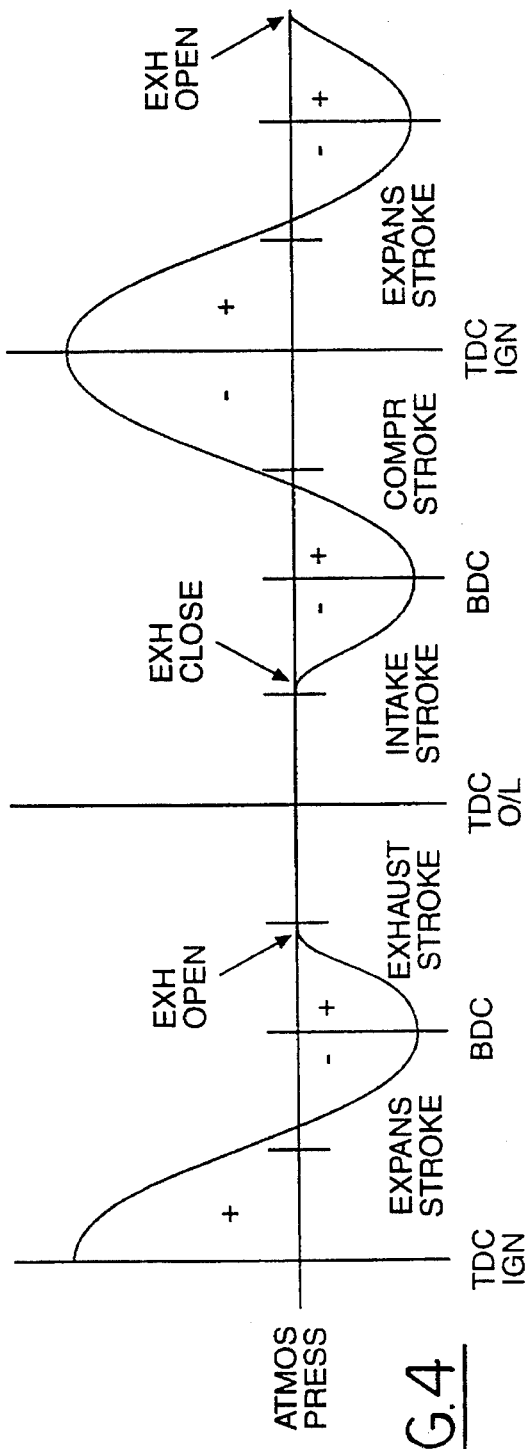
FIG. 4 is a diagram showing cylinder pressure and crankshaft position of an engine having one variant of a system according to the present invention.

Comparing FIGS. 3 and 4, it may be seen that in both cases pressure within the engine's cylinders changes from a negative value at BDC on the expansion stroke to roughly atmospheric pressure during the exhaust stroke. With the prior art system of FIG. 3, which is characterized by disablement of both the intake and exhaust valves of the cylinder, cylinder pressure continues to increase above the atmospheric level, until a maximum value is reached at TDC. This maximum value is the same for TDC at overlap and TDC at ignition.

In contrast to the prior art situation shown in FIG. 3, with an engine having a system according to the present invention, as shown in FIG. 4, the atmospheric pressure which is reached on the exhaust stroke is maintained through a portion of the intake stroke until the exhaust valve closes. Thereafter, pressure decreases to a sub-atmospheric pressure at BDC of the intake stroke and once again increases during the compression stroke to a super-atmospheric value which is then reduced during the expansion stroke, which follows the compression stroke. Because the pressure buildup from sub-atmospheric to atmospheric, which occurs as the piston moves from BDC to TDC on the exhaust stroke is reduced to the same sub-atmospheric pressure during the subsequent expansion to BDC on the intake stroke, the net effect is that the work required to compress the gases within the cylinder is extracted during expansion of the intake stroke, and as a result, very little energy is dissipated within the engine cylinder. Low consumption of energy is aided for the additional reason that controller 30 tightly closes port throttles 28 when the cylinders are deactivated, and this prevents pumping losses which would occur if air was drawn through the intake system during the period in which the cylinders were deactivated. Of course, without the need to deactivate either the intake or the exhaust valves of the cylinder, the present system may be implemented at a lower cost than a system producing the results shown in FIG. 3.

Those skilled in the art will appreciate in view of this disclosure that a variety of camshaft phaser mechanisms could be employed for the purpose of providing camshaft phaser 34. For example, U.S. Pat. No. 5,107,804 discloses but one of a plurality of camshaft phaser mechanisms which could be employed in a system according to the present invention.

FIG. 5 illustrates an alternative method in which exhaust valve timing is advanced about 70 crankshaft degrees from normal timing. Thus, the exhaust valve opens symmetrically about BDC on the expansion stroke and closes well into the exhaust stroke, with the result that pressure within the cylinder is maintained at roughly an atmospheric level between the points at which the exhaust valve opens and closes, and only minimal pressure builds up in the cylinder thereafter, with the pressure build-up being symmetrical about TDC during the O/L position, with an expansion occurring to a sub-atmospheric pressure during the intake stroke, followed by recompression of the air in the cylinder during the compression stroke. As before, the amount of work needed to move the piston up and down in the cylinder is minimized because pressure in the cylinder remains at atmospheric pressure during the time the exhaust valve is open and shifting of the exhaust valve timing causes the pressure pulses within the cylinder to be evenly distributed about rotational positions of the crankshaft at which the direction or motion of the cylinder's piston changes. As seen in FIG. 3, with both valves for the cylinder deactivated in the costly prior art system, an even distribution of cylinder pressure is achieved about the points at BDC and TDC at which the piston's motion changes. The present system achieves the result of even distribution of pressure about TDC and BDC, but without the need for valve disabling mechanisms. And, port throttles may be used for operating the engine in lieu of other types of throttles. Also, exhaust camshaft timing control may be used for beneficial operation in terms of decreased emissions and increased fuel economy, even while the engine is operated in all of the cylinders. Accordingly, the total cost of the hardware needed to operate an engine according to the present invention need not be borne solely by the need for achieving fractional operation of the engine. Yet another advantage of the present system resides in the fact that because the peak pressure achieved in the deactivated cylinders is less than the peak pressure achieved with prior art valve disabling systems, the motoring loss of the deactivated cylinders will be less, with the result that fuel economy will be enhanced.

FIG. 6 is a schematic representation of a V-type of engine—in this case, a V-6—having a system according to the present invention. Those skilled in the art will appreciate in view of this disclosure that a system according to this invention could be used as a V-6 or V-12 engine, or, for that matter, a V-8 engine if the V-8 engine is equipped with a planar crankshaft. In FIG. 6, camshaft 42 comprises a single camshaft for one bank of cylinders of the engine, with camshaft 42 operating both intake and exhaust valves. The bank of cylinders associated with camshaft 42 may be deactivated by single camshaft phaser 34 (not shown) which would be applied to one end of camshaft 42. Conversely, intake camshaft 44 and exhaust camshaft 46 on the opposite bank of engine cylinders, could be driven independently by crankshaft 12, or, alternatively, a camshaft phaser 34 could be applied to exhaust camshaft 46 according to the present invention.

Those skilled in the art will appreciate in view of this disclosure that other types of driving arrangements could be used for camshafts according to the present invention, including that shown in FIG. 7, in which an inline engine 48 has a front group of cylinders 50 and a rear group of cylinders 52. Phaser 34 is applied between the front portion of exhaust camshaft 54$^a$, and a rear portion of exhaust camshaft 54$^b$. As before, camshaft phaser 34 is controlled by controller 30 and will advance or retard the camshaft as commanded by controller 30 to achieve operation of the engine with disabled cylinders according to the present invention.

The volume between each port throttle 28 and its accompanying intake valve 20 should be less than approximately 20% of the displaced volume of the cylinder to prevent a diminution of the efficacy of closing the port throttle due to the throttling loss due to the partially opened intake valve as the trapped charge lying between the port throttle is alternatively compressed and expanded.

While the invention has been shown and described in its preferred embodiments, it will be clear to those skilled in the arts to which it pertains that many changes and modifications may be made thereto without departing from the scope of the invention.

I claim:

1. A four-stroke cycle, multicylinder reciprocating internal combustion engine having a crankshaft and a plurality of pistons reciprocably contained within a plurality of cylinders, with said engine further comprising:

at least one intake popper valve and at least one exhaust popper valve for each engine cylinder;

a camshaft for operating at least the exhaust valves;

a camshaft phaser for powering said camshaft and for adjusting the timing of the camshaft with respect to the rotational position of the crankshaft;

a plurality of intake port throttles, with one of said throttles mounted in proximity to, and upstream of each of said intake valves; and a controller, connected with said port throttles and said camshaft phaser, for deactivating at least some of the cylinders by operating said camshaft phaser and said port throttles such that for each cylinder which is to be deactivated, the port throttle is closed, and the camshaft timing is adjusted such that the exhaust valve opens and closes at points which are approximately symmetrical about a rotational position of the crankshaft at which the direction of motion of the cylinder's piston changes.

2. An engine according to claim 1, wherein said exhaust valve opens and closes in approximately the same number of crankangle degrees about the piston's bottom dead center position at the conclusion of the expansion stroke.

3. An engine according to claim 1, wherein said exhaust valve opens and closes in approximately the same number of crankangle degrees about the piston's top dead center position at the conclusion of the exhaust stroke.

4. An engine according to claim 1, wherein said controller operates said camshaft phaser such that the exhaust camshaft is retarded approximately 110 crankshaft degrees from its normal operating point.

5. An engine according to claim 1, wherein said controller operates said camshaft phaser such that the exhaust camshaft is advanced approximately 70 crankshaft degrees from its normal operating point.

6. An engine according to claim 1, wherein said engine is a v-type having two banks of cylinders, with each bank having a separate exhaust camshaft and an associated camshaft phaser, with said controller operating the camshaft phaser and port throttles of one of said banks of cylinders such that all of the cylinders of such bank are deactivated.

7. An engine according to claim 1, wherein said engine is a v-type having two banks of cylinders, with each bank having a single camshaft for both the intake and exhaust valves and an associated camshaft phaser, with said controller operating the camshaft phaser and port throttles' of one of said banks of cylinders such that all of the cylinders of such bank are deactivated.

8. An engine according to claim 1, wherein said engine is an inline type having a front group of cylinders and a rear group of cylinders, with each group having a separate exhaust camshaft and an associated camshaft phaser, with said controller operating the camshaft phaser and port throttles of one of said groups of cylinders such that all of the cylinders of such group are deactivated.

9. An engine according to claim 1, wherein said engine is an inline type having a front group of cylinders and a rear group of cylinders, with each group having a single camshaft for both the intake and exhaust valves and an associated camshaft phaser, with said controller operating the camshaft phaser and port throttles of one of said groups of cylinders such that all of the cylinders of such group are deactivated.

10. A method for operating a multicylinder, four-stroke cycle reciprocating internal combustion engine on fewer than the maximum number of cylinders, comprising the steps of:

sensing a plurality of engine and vehicle operating parameters, including at least engine load and engine speed;

comparing the sensed operating parameters with predetermined threshold values;

issuing a fractional operation command in the event that the sensed parameters exceed said threshold values;

closing intake port throttles in each of the cylinders to be deactivated in response to the fractional operation command; and adjusting the timing of a camshaft which operates popper exhaust valves of the cylinders to be deactivated so that the position of maximum exhaust valve lift is moved from 90° before top dead center on the exhaust stroke to a point at which maximum lift occurs at top dead center of the exhaust stroke.

11. A method according to claim 10, further comprising the step of stopping the delivery of fuel to the cylinders which are deactivated.

12. A method according to claim 10, wherein said intake port throttles are closed simultaneously with the adjustment of the timing of said camshaft.

13. A four-stroke cycle, multicylinder reciprocating internal combustion engine having a crankshaft and a plurality of pistons reciprocably contained within a plurality of cylinders, with said engine further comprising:

at least one intake popper valve and at least one exhaust popper valve for each engine cylinder;

a camshaft for operating at least the exhaust valves;

a camshaft phaser for powering said camshaft and for timing the camshaft with respect to the rotational position of the crankshaft;

a plurality of intake port throttles, with one of said throttles mounted in proximity to, and upstream of each of said intake valves; and a controller for deactivating at least some of the cylinders by operating said camshaft phaser and said port throttles such that for each cylinder which is to be deactivated, the port throttle is closed and the camshaft is adjusted such that the position of maximum exhaust valve lift is moved from 90° before top dead center on the exhaust stroke to a point at which maximum lift occurs either at top dead center of the exhaust stroke, or at bottom dead center of the expansion stroke.

* * * * *